Jan. 8, 1935.　　　C. H. INGWER　　　1,987,573
COMPOSITE RUBBER ARTICLE
Filed May 31, 1930
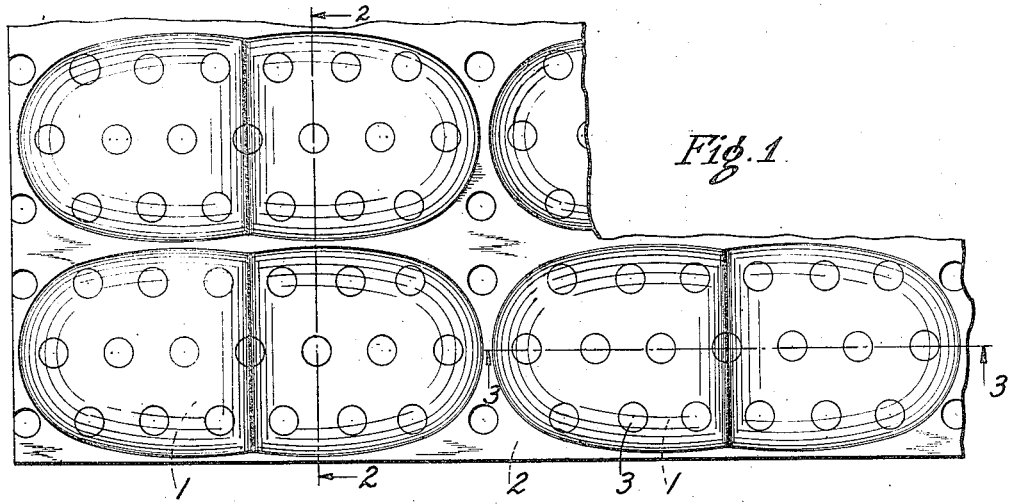
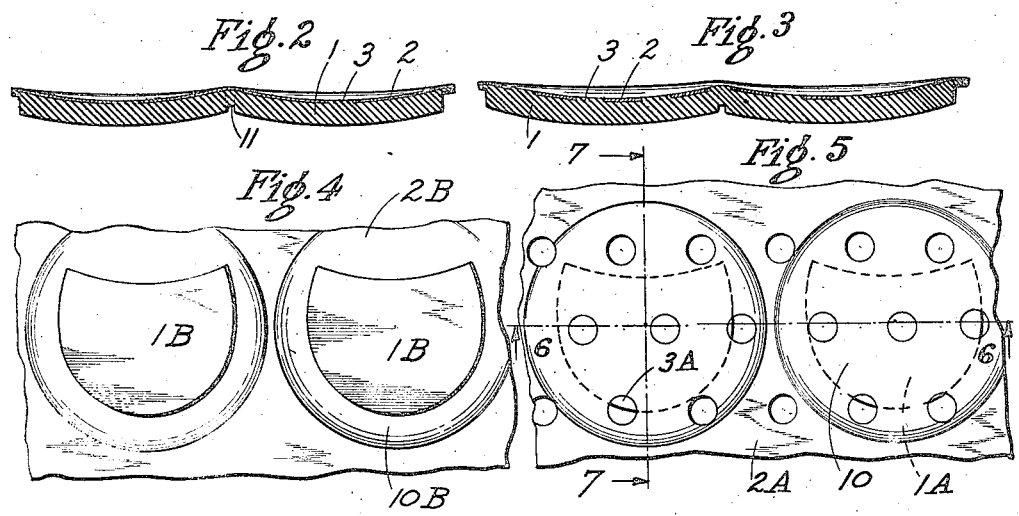
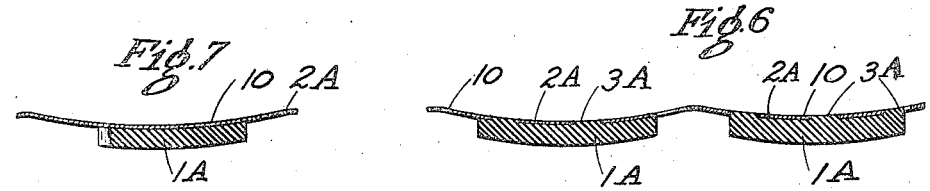
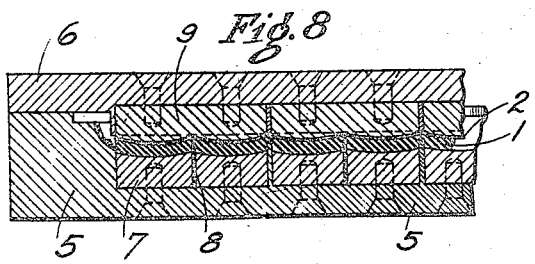
INVENTOR
CARL H. INGWER
BY Richey & Watts
ATTORNEY Patented Jan. 8, 1935

1,987,573

UNITED STATES PATENT OFFICE 1,987,573

COMPOSITE RUBBER ARTICLE

Carl H. Ingwer, Elyria, Ohio, assignor to The
I. T. S. Company, Elyria, Ohio, a corporation
of Ohio Application May 31, 1930, Serial No. 457,909

3 Claims. (Cl. 36—35)

This invention relates to a unitary article comprising a reinforcing or facing sheet or strip and a slab or body of rubber composition which are vulcanized together. The reinforcing or facing sheet or strip may be a material, such as fiber or canvas, having a relatively small amount of elasticity as compared to rubber. In the preferred form the unitary article has a concavo-convex shape.

It is also contemplated as one of the features of this invention that the unitary article referred to in the preceding paragraph may have its convex and concave surfaces, above referred to, substantially like the contour of a segment of a hollow sphere, though the invention is not limited thereto.

A third feature of the invention relates to an article comprising a sheet or slab of rubber composition and a facing or reinforcing sheet or strip vulcanized together forming a unitary sheet, said unitary sheet having a plurality of concavo-convex blanks therein connected together by a relatively thick web.

This invention also relates to the method of forming a unitary article comprising one or more sheets or strips of any suitable material, such as fabric, leather and the like relatively inelastic as compared to rubber composition, said sheet having one or more slabs or bodies of rubber composition vulcanized thereto.

Another of the features of the invention relates to the method of forming a unitary article comprising a reinforcing or facing sheet or strip of any suitable material such as fabric, leather, fiber, and the like which is relatively inelastic as compared to rubber composition said reinforcing or facing sheet having a slab or body of rubber composition vulcanized thereto, said unitary article having convex and concave surfaces on two opposite sides, said convex and concave surfaces preferably being substantially shaped like the periphery of a segment of a hollow sphere.

Articles of rubber composition such as rubber heel lifts or the like are frequently nailed or attached mechanically in some other manner and in addition are cemented to a base or support of less yieldable material such as wood, leather, fiber and the like. The application of intermittent compression to the rubber composition, such as occurs in walking, squeezes the rubber laterally and often loosens the cement connection between the rubber composition and its base.

In the case of high heels, which are covered with fabric, fiber, or some form of leather, such as are used on ladies' shoes, the top portion is made of wood and the covering material is glued to the wooden portion of the heel and the lower end of the covering is secured by being glued and fastened in between the wooden upper portion and the lower portion, often called the "lift". The intermittent compression on the rubber heel lift squeezes the rubber composition laterally and gradually works the covering material out from between the two adjacent surfaces of the wooden and rubber parts of the heel.

In order to avoid the above defect an intermediate strip has been applied between the two adjacent surfaces of the wooden and rubber parts of the heel. This application is time consuming and the connection between the strip and the support often becomes loose after continued use.

In order to provide a tight fit between the adjacent edges of the rubber composition article and its base or support, it is desirable to form the article with a concave attaching surface. This may be accomplished by making the heel concavo-convex in form. When the article is attached to a flat supporting surface by a suitable means such as nails, the article becomes flattened and the edges of the said article close tightly against the supporting member due to the inherent resilience of the rubber composition and the concavo-convex form of the heel.

Under previous methods of manufacture it has not been thought possible to vulcanize a body of rubber composition to a reinforcing or facing strip of another material, such as fabric, fiber, or the like, having a relatively small amount of elasticity as compared to rubber composition, said reinforcing or facing strip forming the face of the concave surface. The reason for this is the fact that the rubber composition shrinks in volume as a consequence of the vulcanizing operation and tends to draw the strip of material into a convex shape.

Accordingly it is one of the objects of the invention to form, for any purpose, a unitary article comprising a reinforcing or facing sheet or strip of material, such as fabric, fiber, or the like, and a slab or body of rubber composition which is vulcanized to the sheet, said reinforcing or facing sheet or strip being of a material having a relatively small amount of elasticity as compared to rubber composition, said unitary article having a concave surface on one face and said reinforcing or facing sheet or strip constituting the part of the unitary article adjacent said concave face.

Another object of the invention is to form a unitary sheet comprising a slab of rubber composition vulcanized to a sheet or strip of facing or reinforcing material, said unitary sheet having a plurality of concavo-convex blanks therein connected by a relatively thick web.

A more specific object of the invention is to form a heel lift with a rubber or rubber composition wearing part and an integrally connected upper reinforcing part of sheet or strip material, the heel lift having an upwardly facing concave surface preferably substantially of the contour of a segment of a hollow sphere.

Other objects will be apparent from the specification and the accompanying drawing in which Fig. 1 is a plan view of a sheet or strip of rubber composition together with an integral perforated facing or reinforcing sheet.

Fig. 2 is a transverse section thru the sheet taken along the line 2—2 of Fig. 1;

Fig. 3 is a longitudinal section thru the sheet taken along the line 3—3 of Fig. 1;

Fig. 4 is a plan view of another embodiment showing the reinforcing or facing sheet or strip without any perforations therein;

Fig. 5 is a plan view of another embodiment showing a plurality of separated heel lifts vulcanized to the reinforcing or facing sheet or strip;

Fig. 6 is a transverse sectional view taken on the line 6—6 of Fig. 5;

Fig. 7 is a longitudinal sectional view taken on the line 7—7 of Fig. 5.

Fig. 8 is a sectional view through a mold showing the heel lifts in an illustrative process of formation.

In Figs. 1, 2, and 3 is shown an embodiment of the invention in which a sheet of rubber composition is vulcanized to a continuous perforated reinforcing or facing strip. In these figures a plurality of heel-shaped bodies of rubber composition 1 are shown connected together by a relatively thick web 11 of the same material. The web may be made as thick as the heel lift itself. The use of a thick web facilitates the molding and vulcanizing operations. The invention however is not limited to the use of a thick web. A thin web or the form shown in Figs. 5, 6, and 7 may be used if desired.

On the upper side of the heel-shaped bodies and the web is shown a perforated reinforcing or facing sheet or strip 2 of some suitable material such as fabric, leather, fiber or the like which is vulcanized on to the upper surface of the rubber composition. Each perforation is filled with a projection 3 of rubber composition which flows therein during the heat and pressure of the vulcanizing operation to form interlocking engagement with the layer of stiffening material.

As is clearly shown in Figs. 2 and 3, the upper surface, where the reinforcing or facing sheet or strip is shown, of each heel-shaped body is shown concave and the lower surface of each heel-shaped body is convex. These concave and convex surfaces are substantially of the contour of a segment of a hollow sphere so that they are concave and convex, respectively, on every line of cross section which makes each heel-shaped body of concavo-convex shape.

In practice the heels of the type shown in Figs. 1, 2, and 3 are sold in sheet or strip form and the shoemaker or other user cuts the webbing from around each heel-shaped body and thus removes the heel from the sheet. It will be seen that when a heel lift or other article of concavo-convex form is nailed to a heel or other support, the heel lift or other article will be flattened thereby against the heel or other support and the edges of the heel or other article will be pressed tightly against the edges of the heel or other support because of the tendency of the heel or other article to return to its original shape.

The perforations are not necessary, however, and may be dispensed with, if desired, as shown in Fig. 4. The mere adhesion of the vulcanized rubber to the reinforcing or facing material has been found to be sufficient in practice. In Fig. 4 are shown heel-shaped bodies 1B of rubber composition vulcanized on to the facing sheet or strip 2B. The facing material at 10B is shown deformed into a surface substantially like that of the contour of a segment of a hollow sphere.

Referring to Figs. 5, 6, and 7, a modification is therein illustrated in which the heel-shaped bodies are connected only by the reinforcing or facing material which is shown perforated. The sheet or strip of facing or reinforcing material 2A is shown deformed into the concavo-convex surfaces 10 which have a contour substantially like a segment of a hollow sphere. The heel-shaped bodies 1A are vulcanized to the convex surfaces 10 of the sheet or strip of facing or reinforcing material 2A. The projections 3A of the part of rubber composition extend into the perforations of the facing sheet or strip 2A thereby forming an interlocking connection between the rubber composition 1A and the facing sheet or strip 2A.

The vulcanizing operation is preferably effected in a flat mold such as is illustrated in Fig. 8 and is similar to that described and claimed in my copending application, Serial No. 295,513, filed July 26, 1928. The mold comprises a bottom 5 and a top 6. The bottom 5 has a large recess on its top face in which a plurality of sections 7 are carried. Each section 7 has a face on its upper surface which is concave on every line of cross-section and preferably substantially of the contour of the segment of a sphere. The sections 7 are spaced by the members 8 which protrude thereabove.

The top 6 carries the members 9 which are provided with convex surfaces opposite the concave surface of the members 7. This forms a plurality of concavo-convex cavities between sections 7, and the members 9, the cavities being divided from one another by the members 8 which shape or form the webbing between the unitary articles or heel lifts.

In forming the unitary articles, such as rubber heel lifts, a sheet of rubber composition 1, 1A, or 1B is applied to the surfaces of the members 7 and 8 after which a sheet of reinforcing or facing material 2, 2A or 2B is placed on top of the sheet of rubber composition. The upper mold section 6 is now placed upon the lower mold section 5 and the two sections pressed together thereby compressing the sheet of rubber composition and the sheet of reinforcing or facing material which have been placed into the mold. This operation causes the rubber composition and the reinforcing or facing material to fill all parts of the cavities in the mold and to assume the proper shape. The upper and lower sections are secured together in this state and the mold and material therein are then subjected to suitable temperatures for a proper length of time to effect vulcanization. Upon cooling the vulcanized sheet retains the shape it has assumed during vulcanization and supplies a plurality of unitary articles, such as heel lifts, of concavo-convex form which are connected together by a web. This method obviates the former difficulties.

While the invention has been described as applied to the manufacture of heel lifts of rubber composition, the scope of the invention is not limited thereto, but other articles of a concavo-convex shape such as heels, soles or slabs of rubber composition or any of its substitutes, having a reinforcing or facing sheet or strip of another material for any purpose fall within the scope of the invention.

While a preferred embodiment of the invention has been shown and described, it will be apparent that modifications can be made therein within the spirit and scope of the invention and such modifications are intended to be covered by the appended claims.

By composition is meant rubber, rubber composition, or any substitutes therefor.

I claim:

1. A heel comprising a concavo-convex rubber body and a sheet of thin fibre molded and vulcanized to the entire concave surface of said body to prevent lateral displacement of the edge of the heel.

2. A heel comprising an upper non-resilient solid portion, a lower ground engaging resilient portion provided with a concave attaching face, and means comprising a thin fiber material molded and vulcanized to the attaching face of the ground engaging portion and overlying the entire surface thereof for retaining the lower ground engaging portion from lateral displacement adjacent the upper solid portion.

3. A heel comprising a concavo-convex rubber body and a sheet of thin fiber molded and vulcanized to substantially all of the concave surface of said body and extending to the edge of the heel at all portions thereof to prevent lateral displacement of the edge of the heel.

CARL H. INGWER.